United States Patent
Daniel

(10) Patent No.: US 6,174,097 B1
(45) Date of Patent: *Jan. 16, 2001

(54) COLLAPSIBLE KEYBOARD

(75) Inventor: Simon Richard Daniel, Abbotswood, Rowhills, Farnham, Surrey GU9 9AU (GB)

(73) Assignee: Simon Richard Daniel (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/400,569

(22) Filed: Sep. 21, 1999

Related U.S. Application Data

(63) Continuation of application No. PCT/GB98/00841, filed on Mar. 20, 1998.

(30) Foreign Application Priority Data

Mar. 21, 1997 (GB) .................................................. 9705881

(51) Int. Cl.[7] ........................................................ B41J 5/08
(52) U.S. Cl. ............................................ 400/472; 400/492
(58) Field of Search ..................................... 400/472, 492, 400/473, 478; 345/168, 169; 341/22, 21; 361/680; 235/145 A, 145 R, 146; 200/5 R, 52 R; 248/118.5, 118.3, 118.1, 118

(56) References Cited

U.S. PATENT DOCUMENTS

| | | | |
|---|---|---|---|
| Re. 32,419 | 5/1987 | Rooney | 200/5 R |
| 3,499,515 | 3/1970 | Mikrut | 197/98 |
| 3,574,335 | 4/1971 | Ricke | 235/145 |
| 3,576,569 | 4/1971 | Watson | 340/166 |
| 3,693,123 | 9/1972 | Pedersen | 335/206 |
| 3,703,040 | 11/1972 | Hill | 35/5 |
| 3,893,559 | 7/1975 | Hishida et al. | 197/17 |
| 3,940,758 * | 2/1976 | Margolin | 340/337 |
| 4,066,850 | 1/1978 | Heys, Jr. | 200/5 A |

(List continued on next page.)

FOREIGN PATENT DOCUMENTS

| | | |
|---|---|---|
| 0235733 | 9/1987 | (EP) . |
| 0640489 | 3/1995 | (EP) . |
| 2279617 | 1/1995 | (GB) . |
| 9103012 | 3/1991 | (WO) . |

OTHER PUBLICATIONS

Keyboard Key to New Notebooks; Margaret Williamson, Computing Canada; Jul. 4, 1996; (p. 23).
Internet Shopping 'Applicnace' Rolling Out; Michael Katz, Broadcasting & Cable's Telemedia Week; vol. 126, No. 16; Apr. 15, 1996; (pp. 81–82).
Compact Computer Keyboard; IBM Technical Bulletin; vol. 27, No. 10A, Mar. 1985; (pp. 4).
Briefcase–Portable Textwriter With 100–Key Full–Size Keyboard; IBM Technical Disclosure Bulletin; vol. 27, No. 4A, Sep. 1984; (pp. 3).
Keyboard; IBM Technical Bulletin Disclosure; vol. 27, No. 4B, Sep. 1984 (p. 1).

*Primary Examiner*—John S. Hilten
*Assistant Examiner*—Anthony H. Nguyen
(74) *Attorney, Agent, or Firm*—Conley, Rose & Tayon

(57) ABSTRACT

A collapsible keyboard that is collapsible between a deployed configuration in which the keyboard is generally planar and a collapsed configuration, the keyboard being foldable about three substantially parallel axes between the deployed and collapsed configurations, the keyboard having four rigid subframes for supporting keys, each subframe being pivotally connected at a folding axis to an adjacent subframe. The keyboard preferably has support frames supporting keys thereon. The keys are slidable and are connected by flexible connectors that span the axes. The keyboard can be locked in either the collapsed or deployed configuration and can be combined with a remote communication unit.

13 Claims, 10 Drawing Sheets

U.S. PATENT DOCUMENTS

| | | | |
|---|---|---|---|
| 4,092,527 | 5/1978 | Luecke | 364/709 |
| 4,336,530 | 6/1982 | Koike et al. | 340/365 |
| 4,366,463 | 12/1982 | Barker | 338/69 |
| 4,368,364 | 1/1983 | Harbers, Jr. | 200/6 R |
| 4,517,660 | 5/1985 | Fushimoto et al. | 364/708 |
| 4,560,844 | 12/1985 | Takamura et al. | 200/5 A |
| 4,633,227 | 12/1986 | Menn | 340/365 |
| 4,638,151 | 1/1987 | Suwa | 235/145 R |
| 4,661,005 | 4/1987 | Lahr | 400/489 |
| 4,735,520 | 4/1988 | Suzuki et al. | 400/488 |
| 4,818,828 | 4/1989 | Curley et al. | 200/5 A |
| 4,914,999 | 4/1990 | Masubuchi et al. | 84/423 R |
| 4,939,514 | 7/1990 | Miyazaki | 341/22 |
| 4,996,522 | 2/1991 | Sunano | 340/700 |
| 5,044,798 | 9/1991 | Roylance et al. | 400/472 |
| 5,122,786 | 6/1992 | Rader | 340/711 |
| 5,137,384 | 8/1992 | Spencer et al. | 400/489 |
| 5,141,343 | 8/1992 | Roylance et al. | 400/472 |
| 5,163,765 | 11/1992 | Levy | 400/492 |
| 5,164,723 | 11/1992 | Nebenzahl | 341/23 |
| 5,187,644 | 2/1993 | Crisan | 361/393 |
| 5,198,991 | 3/1993 | Pollitt | 364/708 |
| 5,210,846 | 5/1993 | Lee | 395/425 |
| 5,212,473 | 5/1993 | Louis | 340/711 |
| 5,227,615 | 7/1993 | Oogita | 235/440 |
| 5,252,971 | 10/1993 | Franz et al. | 341/26 |
| 5,267,127 | 11/1993 | Pollitt | 361/680 |
| 5,278,779 * | 1/1994 | Conway et al. | 400/472 |
| 5,287,245 | 2/1994 | Lucente et al. | 361/680 |
| 5,329,079 | 7/1994 | English et al. | 200/5 A |
| 5,341,154 | 8/1994 | Bird | 345/167 |
| 5,383,138 | 1/1995 | Motoyama et al. | 364/708 |
| 5,398,326 | 3/1995 | Lee | 395/425 |
| 5,398,585 | 3/1995 | Starr | 84/646 |
| 5,422,447 | 6/1995 | Spence | 200/5 A |
| 5,424,728 | 6/1995 | Goldstein | 341/22 |
| 5,454,652 | 10/1995 | Huellemeier et al. | 400/489 |
| 5,457,453 | 10/1995 | Chiu et al. | 341/22 |
| 5,459,461 * | 10/1995 | Crowley et al. | 400/491.1 |
| 5,476,332 | 12/1995 | Cleveland, Jr. | 400/486 |
| 5,481,074 | 1/1996 | English | 200/5 A |
| 5,494,363 * | 2/1996 | Hochgesang | 400/472 |
| 5,502,460 | 3/1996 | Bowen | 345/168 |
| 5,519,569 | 5/1996 | Sellers | 361/680 |
| 5,532,904 | 7/1996 | Sellers | 361/680 |
| 5,543,787 | 8/1996 | Karidis et al. | 341/20 |
| 5,543,790 | 8/1996 | Goldstein | 341/22 |
| 5,557,057 | 9/1996 | Starr | 84/617 |
| 5,574,481 * | 11/1996 | Lee | 400/472 |
| 5,575,576 | 11/1996 | Roysden, Jr. | 400/472 |
| 5,587,875 | 12/1996 | Sellers | 361/680 |
| 5,588,759 | 12/1996 | Cloud | 400/472 |
| 5,590,020 | 12/1996 | Sellers | 361/680 |
| 5,591,927 | 1/1997 | Kawamura et al. | 84/171 |
| 5,596,480 | 1/1997 | Manser et al. | 361/680 |
| 5,602,715 | 2/1997 | Lempicki et al. | 361/680 |
| 5,612,691 | 3/1997 | Murmann et al. | 341/22 |
| 5,635,928 | 6/1997 | Takagi et al. | 341/22 |
| 5,644,338 * | 7/1997 | Bowen | 345/168 |
| 5,646,817 | 7/1997 | Manser et al. | 361/680 |
| 5,648,771 | 7/1997 | Halgren et al. | 341/22 |
| 5,653,543 * | 8/1997 | Abe | 400/489 |
| 5,654,872 | 8/1997 | Sellers | 361/680 |
| 5,659,307 | 8/1997 | Karidis et al. | 341/22 |
| 5,677,826 | 10/1997 | Sellers | 361/680 |
| 5,687,058 * | 11/1997 | Roylance | 361/680 |
| 5,703,578 | 12/1997 | Allison | 341/22 |
| 5,706,167 | 1/1998 | Lee | 361/680 |
| 5,712,760 | 1/1998 | Coulon et al. | 361/680 |
| 5,733,056 | 3/1998 | Meagher | 400/472 |
| 5,774,384 | 6/1998 | Okaya et al. | 364/708.1 |
| 5,788,386 | 8/1998 | Hayashi et al. | 400/489 |
| 5,800,085 | 9/1998 | Lee | 400/489 |

* cited by examiner

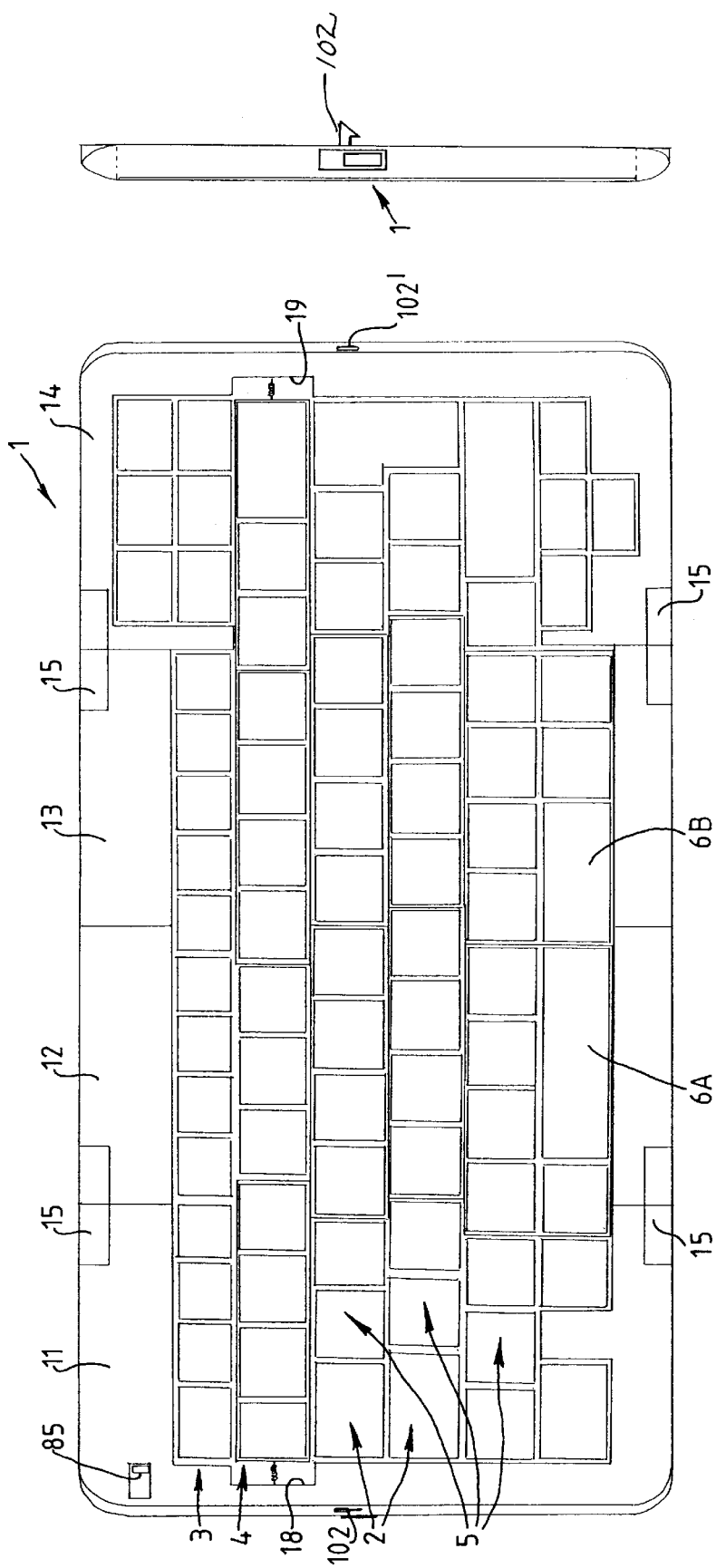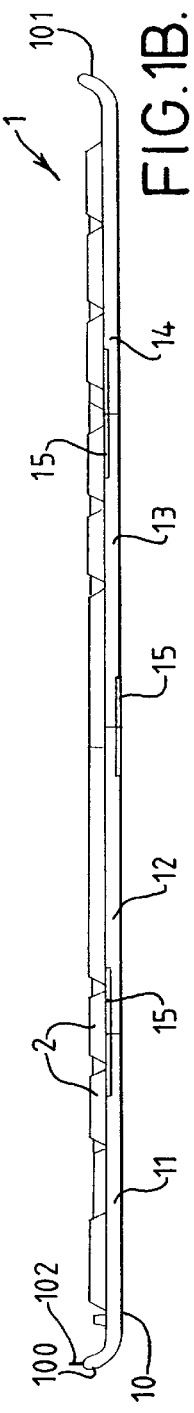
FIG.1A.
FIG.1B.
FIG.1C.

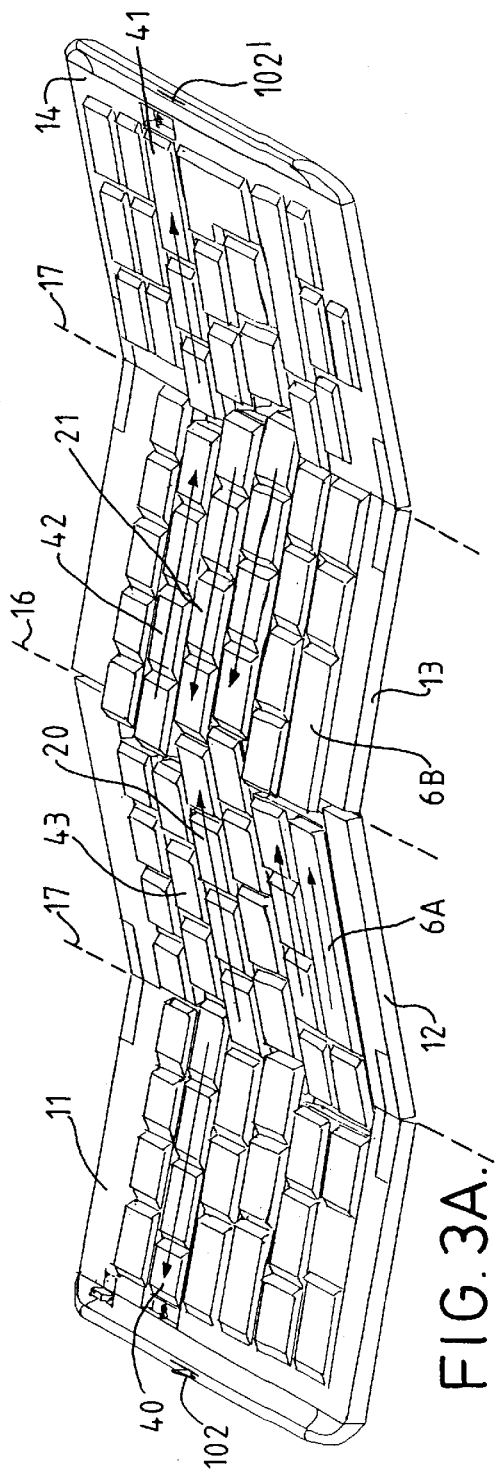
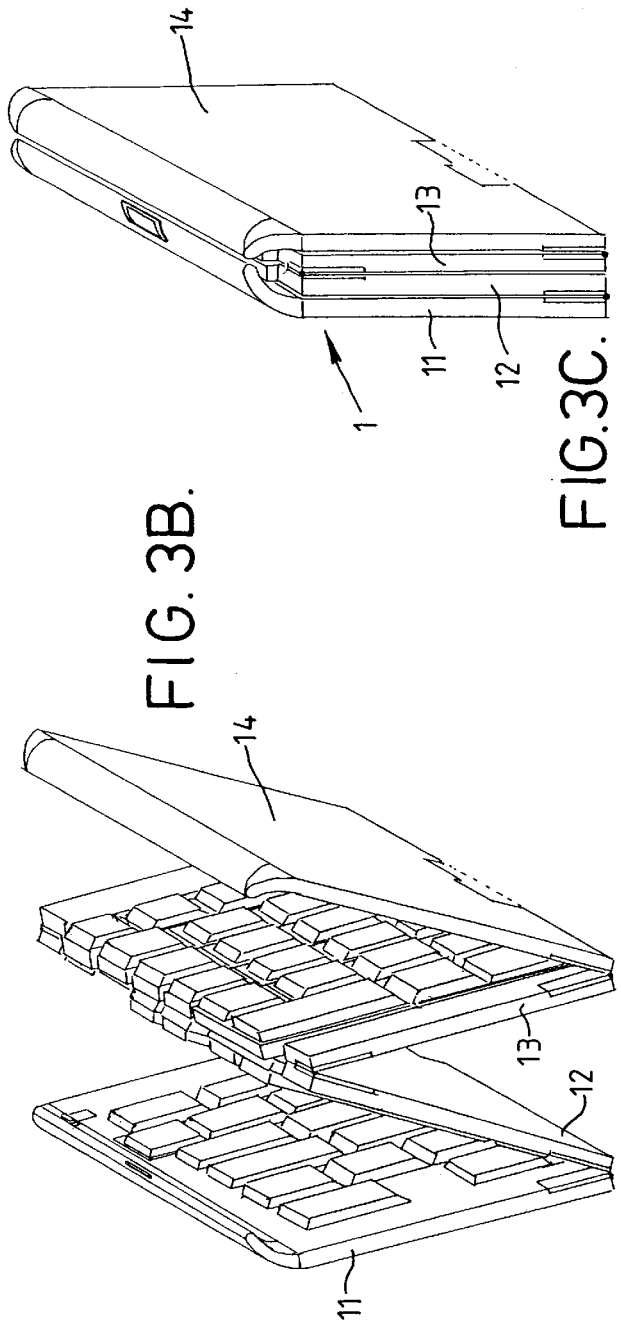
FIG. 3A.
FIG. 3B.
FIG. 3C.

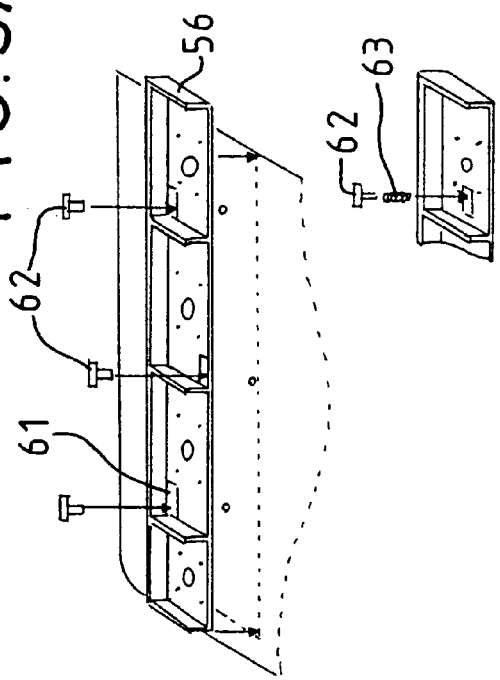
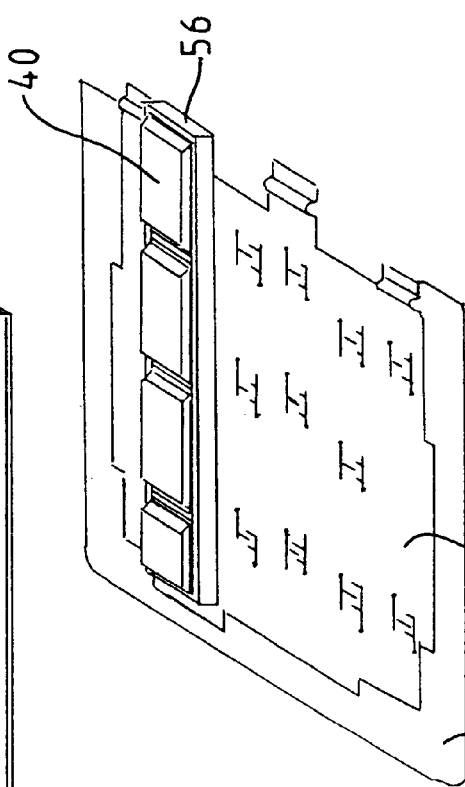
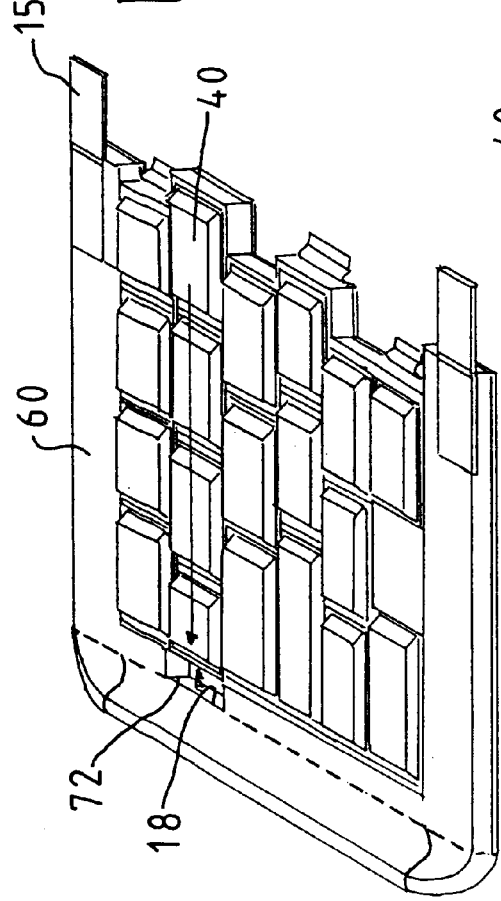

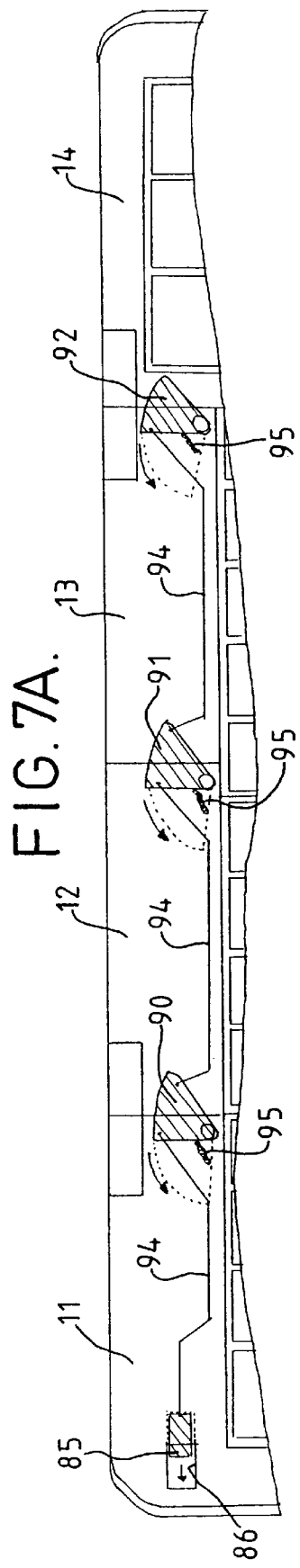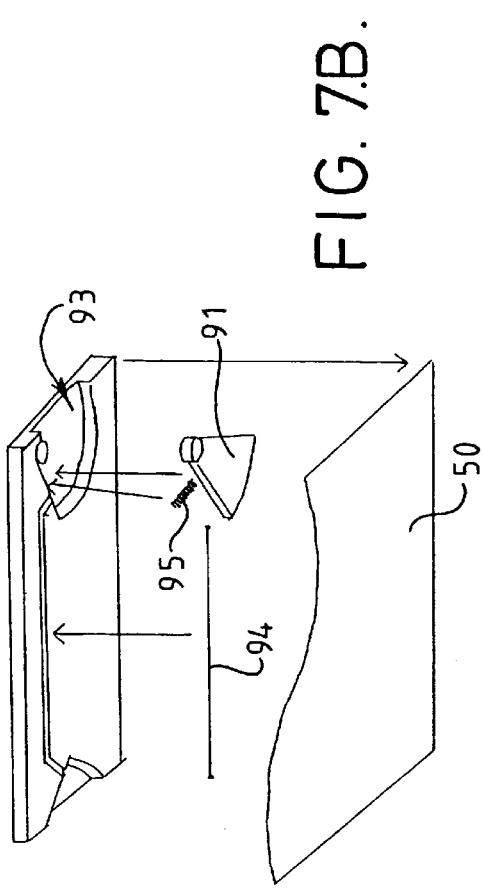

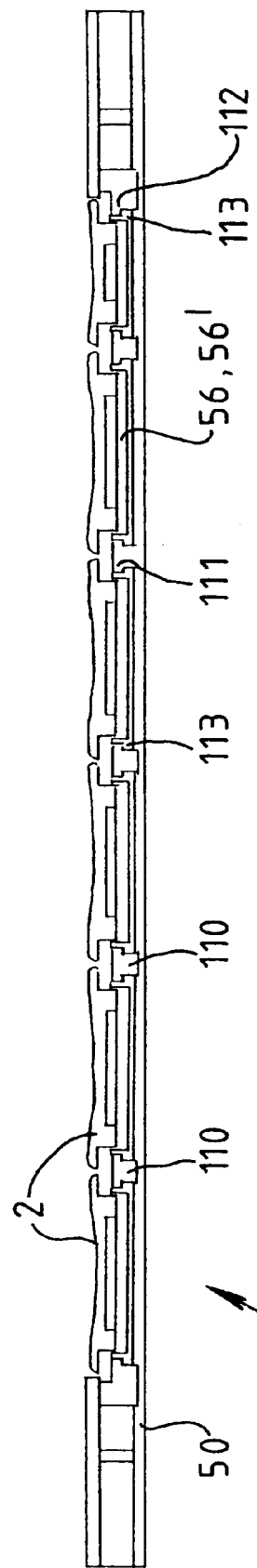

COLLAPSIBLE KEYBOARD

CROSS-REFERENCE TO RELATED APPLICATIONS

This is a continuation of International Application PCT/GB98/00841, with an international filing date of Mar. 20, 1998, which claims priority from GB/9705881.2 and has a priority date of Mar. 21, 1997.

The present invention relates to a collapsible keyboard.

There have been various proposals for collapsible keyboards for use with computers and particularly for use with portable computers. One of the main constraints when attempting to reduce the size of a portable computer is the fact that the keyboard must be greater than a certain minimum size in order to be usable by a person. If a keyboard is too small, the keys become too small and cramped to be used effectively. In several prior art proposals, including for example that shown in U.S. Pat. No. 3,940,758, the number pad of the keyboard is positioned on a separate part of the keyboard which is attached to the main portion of the keyboard holding the alphabetic and other control keys so that the number pad can be folded over onto the main part of the keyboard when the keyboard is not in use, thereby to reduce the overall size of the keyboard. However, in practice, this still does not reduce the overall size of the keyboard very much. As the other components of portable computers, such as display screens and hard disk drives, become increasingly smaller as the technology improves, there is an increasing need to reduce the overall size of the keyboard. Furthermore, there are various computers available now or shortly which do away with a keyboard and use a pen input to a touch-sensitive screen or voice-activation for example. However, users often find a keyboard convenient to use, but do not wish to carry a separate keyboard with them as keyboards have conventionally been very bulky. There is therefore also a need for an independent keyboard which can be used as an optional accessory to a computer and which is conveniently stored when not in use. Such a keyboard could also be used with mobile telephones, electronic organisers and potentially with interactive television systems, screen telephone units, and the like.

EP-A-0640489 discloses a foldable computer which has a keyboard which can be folded in half about a central axis transversely of the keyboard and which is attached to a separate portion containing the processor which is foldable about an axis arranged longitudinally of the keyboard.

U.S. Pat. No. 5,459,461 discloses an inflatable keyboard which can be deflated and then rolled or folded for storage and inflated for use.

SUMMARY OF THE INVENTION

According to the present invention, there is provided a collapsible keyboard, the keyboard being collapsible between a deployed configuration in which the keyboard is generally planar and a collapsed configuration, the keyboard being foldable about three substantially parallel axes between the deployed and collapsed configurations, the keyboard having four rigid subframes for supporting keys, each subframe being connected at a folding axis to an adjacent subframe.

Preferably, the keyboard is foldable in one direction about the middle axis and in the opposite direction about the adjacent axes. Thus, the keyboard may fold through a "W" shape so as to collapse in a concertina-like fashion.

The keyboard may have keys at least some of which are slidable in the plane of the keyboard in a direction transverse of said axes. As the keyboard is folded, the slidable keys, which in the deployed configuration may overlap a folding axis, can move away from said folding axis so as to facilitate or allow folding of the keyboard and also to provide a straight edge with no keys overlapping the folding axes in the collapsed configuration.

At least some of the slidable keys may be connected to other keys by flexible means passing over an axis so as to cause said at least some slidable keys to slide as the keyboard is folded. The keyboard is constructed such that at least some of the slidable keys are biased toward their deployed position when the keyboard is deployed.

The keyboard may further comprise a support structure for keys. The support structure is preferably a matrix of cells, each cell accommodating a respective key. In the collapsed configuration, the support structure preferably encases each depressed key. This protects and hides the key mechanism, particularly at the edges of the folding axes in the collapsed configuration. Where some of the keys are slidable, corresponding portions of the support structure may be slidable with the slidable keys.

A lock may be provided for locking the keyboard in its deployed configuration. The lock may comprise locking elements that are biased into recesses in subframes of the keyboard. The lock may be releasable by operation of a button connected to the locking means.

A lock may also be provided for locking the keyboard in its collapsed configuration.

The keyboard may be combined with a remote control unit. This has particular application for use with a television type unit, for example.

While reference is made herein primarily to the keyboard being useful for a portable computer, it will be appreciated that the principles of the present invention can be applied to a keyboard for a desktop computer, a so-called "personal digital assistant" or "electronic organiser", or used as an independent portable pocket-sized keyboard for use with such devices, or, indeed, to any kind of generally planar input device such as a keyboard for a musical instrument such as an electric piano or synthesizer.

BRIEF DESCRIPTION OF THE DRAWINGS

Embodiments of the present invention will now be described by way of example with reference to the accompanying drawings, in which:

FIGS. 1A to 1C are respectively a plan view, a side elevation and an end elevation of an example of a keyboard in its deployed configuration;

FIGS. 3A to 3C are respectively views of the keyboard just after folding has begun, almost in its collapsed configuration, and in its fully collapsed configuration;

FIGS. 5A to 5C are sequential perspective views of a preferred assembly method for a portion of the keyboard;

FIG. 5D is a partial exploded view of an alternative embodiment of FIG. 5A;

FIGS. 7A and 7B are a partial schematic plan view and a partial schematic perspective view, respectively, of an alternative locking mechanism for the keyboard;

FIG. 9 is a cross-sectional view of a further example of a keyboard in accordance with the present invention;

FIG. 10 is an expanded view of a portion of FIG. 9; and

DETAILED DESCRIPTION OF THE PREFERRED EMBODIMENTS

Figure 2:
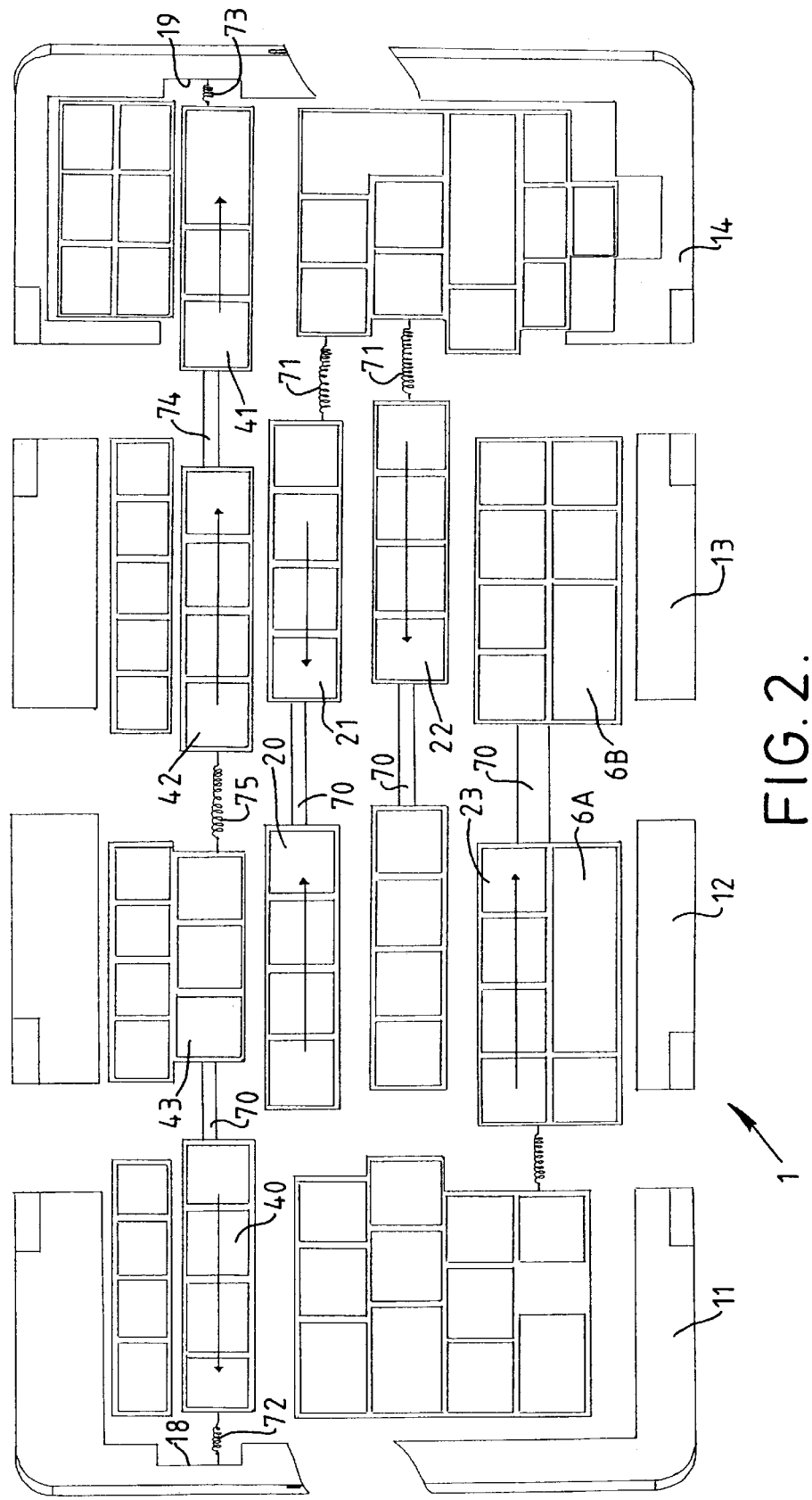
FIG. 2 is a schematic fragmentary plan view of the keyboard.

A keyboard 1 is particularly useful for providing a compact keyboard for a portable computer. The keyboard 1 is generally planar in the deployed configuration shown in FIG. 1. The keyboard 1 has plural keys 2 distributed over its upper surface generally in a format which is familiar to users of computer keyboards in general. In particular, there is a row 3 including function keys; a row 4 including digits (from 1 to 9 and 0); three rows 5 which include alphabetic keys; and a space bar 6 which, for reasons to be described below, is in two parts 6A,6B. Other keys such as "CTRL", "ALT", "TAB", etc. which are familiar to computer keyboard users are also provided generally in their conventional positions.

The keyboard 1 has a support frame 10 which is in four generally rectangular portions referred to herein as subframes 11–14. The subframes 11–14 are connected in series at respective long edges to each other by hinges 15 as shown. In particular, the first subframe 11 is connected to the subframe 12 by hinges 15 at their adjacent corners, these hinges 15 being mounted on or towards the uppermost portion of the keyboard 1. The third and fourth subframes 13,14 are similarly connected at adjacent corners by hinges 15 on the uppermost surface of the keyboard 1. The second and third subframes 12,13 are connected at their adjacent corners by hinges 15 which are fixed on or towards the lowermost surface of the keyboard 1. Thus, as shown in FIGS. 3A and 3B for example, the keyboard 1 folds in a concertina-like fashion through a W-shape in which the central axis 16 moves relatively upwards whilst the two outermost axes 17 move relatively downwards. The arrangement of the keys 2 and the hinges 15 is preferably such as to allow the keyboard 1 to be completely collapsed to the configuration shown in FIG. 3C in which the various keys 2 on the subframes 11–14 touch one another and depress such that the keys are stored under compression in the collapsed configuration. This provides for an extremely compact collapsed keyboard 1. For example, in the deployed configuration shown in FIG. 1, the keyboard may have a size of 30×15×0.5 cm with the keys protruding 3 mm above this when not depressed, whereas, in the collapsed configuration, the collapsed keyboard 1 may have a size of just 8×15×2 cm.

As the keyboard 1 is folded towards its collapsed configuration, the keys immediately either side of the outermost folding axes 17 will tend to approach each other and, indeed, may obstruct the folding of the keyboard 1. The keys may also overlap the outermost folding axes 17 in the collapsed configuration, which may make the keys vulnerable to damage and also may produce an unsightly jagged edge in the collapsed configuration.

There are various possible ways of preventing these keys from hindering complete collapse of the keyboard 1. For example, computer keys are often bevelled so that their base is wider than their top. This bevelling alone may be sufficient to prevent the keys adjacent the outermost axes 17 from contacting each other. Alternatively or additionally, a dead space or recess may be formed under the keys adjacent the outermost axes 17, these recesses accommodating the edges of these keys as the keyboard 1 is folded. The recesses may be covered by a flexible flap which is moved aside by the keys when the keyboard 1 is folded to its collapsed configuration. The recesses will be described further below.

However, in the most preferred embodiment, the keys which otherwise might cause obstruction are allowed to be slidable so that as the keyboard 1 is folded, the slidable keys can move away from the axes 17 to allow complete collapse of the keyboard 1 to take place. The use of sliding keys means that the keyboard 1 can retain the familiar relatively staggered layout of the keys in the deployed configuration, which is particularly important for touch typists who rely on the various keys 2 being in predetermined positions on a keyboard 1. Furthermore, the use of sliding keys allows those keys to be withdrawn into the folded keyboard 1, which provides a straight edge at the outermost folding axes 17 and also allows the keys to be protected in the collapsed keyboard 1.

The keys which are made slidable are preferably those that overlap or project over the outermost axes 17. For convenience, the slidable keys may be grouped in sets which respectively extend across the width of the subframe 11–14 concerned. In particular, the first four digit keys 40 mounted on the first subframe 11 are slidable away from the first foldable axis 17 (i.e. to the left in FIGS. 1A and 3A) and can move into a recess 18 provided in edge of the subframe 11. Similarly, the last three digit keys 41 which are mounted on the fourth subframe 14 to the right hand side of the keyboard 1 can move into a recess 19 provided in the edge of the subframe 14, the last set 41 of the digit keys 4 moving away from the centre of the keyboard 1 and the rightmost folding axis 17. In the first row of alphabetic keys 5 which is immediately below the digit keys 4, the two sets 20,21 of central keys, i.e. those mounted on the two central subframes 12,13, can move towards each other, i.e. towards the central axis 16 and away from the outermost axes 17, so that these sets of keys 20,21 clear the outermost axes 17 during folding of the keyboard 1. Other sets of keys supported on the central subframes 12,13 and which also overlap the outermost axes 17 can be arranged to slide towards the central axis 16 as indicated in FIG. 3A, again to ensure that these sets of keys do not obstruct folding of the keyboard 1, such as sets 22,23. The last two rows of keys including the part 6A of the space bar 6 on the second subframe 12 are movable as a set 23. Finally, if any of the keys overlap the central axis 16 by a significant degree, for example the set 42 of digit keys supported by the third subframe 13, such keys can be arranged to slide slightly away from the central axis 16 so that such keys 42 do not project beyond the edges of the respective subframes 11–14 when the keyboard 1 is in its collapsed configuration. It will be appreciated that the space bar 6 needs to be split into two portions 6A,6B as mentioned above as the space bar 6 crosses the central axis 16 and, as a consequence, will have two linked electrical connection contact points.

Figure 4:
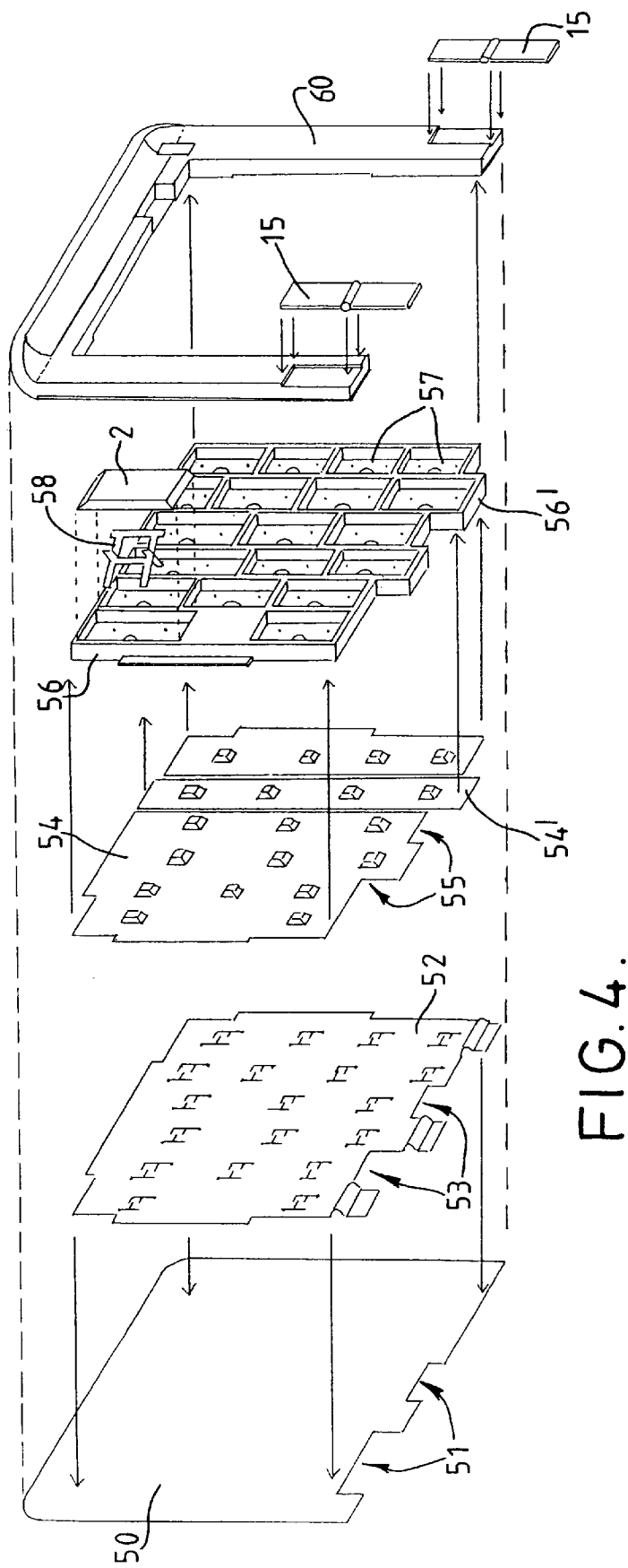
FIG. 4 is an exploded view of one section of the keyboard.
Figure 6A:
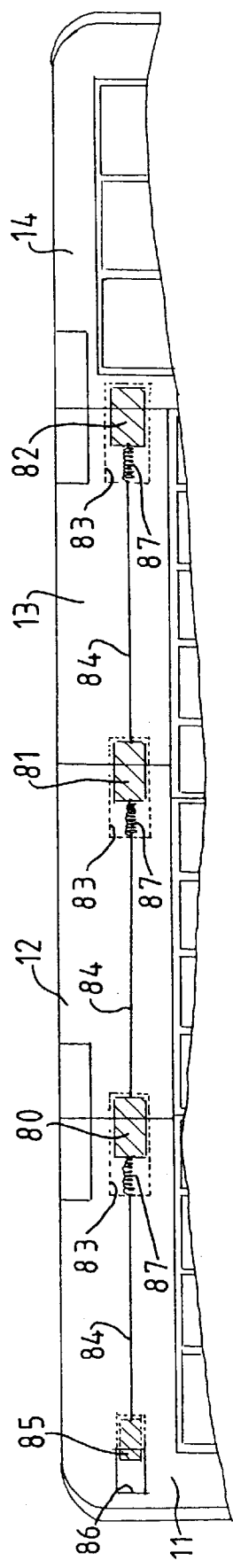
FIG. 6A is a partial schematic plan view of a preferred locking mechanism for the present keyboard.
Figure 6B:
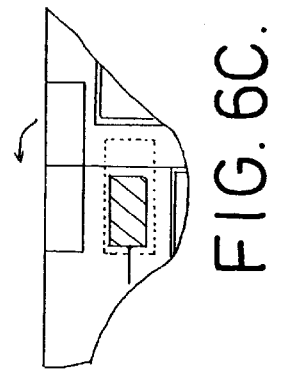
FIG. 6B is a side view of a first feature of the mechanism of FIG. 6A.
Figure 6C:
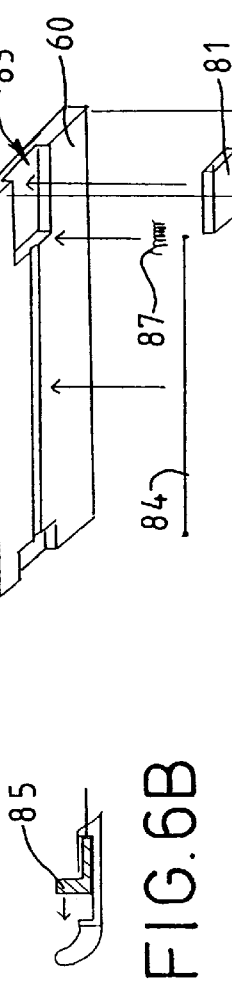
FIGS. 6C and 6D are a partial plan view and a partial perspective view, respectively, of a second feature of the mechanism of FIG. 6A.
Figure 6D:
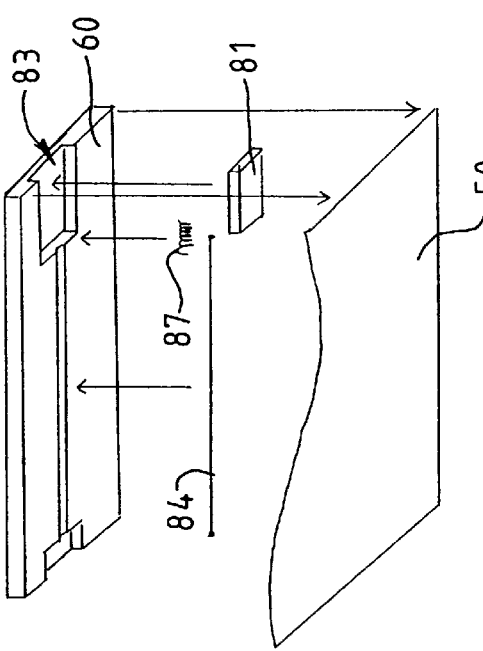

In FIG. 4, there is shown an exploded view of a typical subframe 11. It will be understood that the other subframes 12–14 are constructed in a similar fashion. The subframe 11 has a planar rectangular base 50 made of a rigid material such as metal or rigid plastics. A planar circuit board 52 is fixed to the base 50 and is connected to circuit boards on the other subframes 12,13,14 by a flexible wire loop (not shown). A rubber bubble sheet 54 fits over the circuit board 52 to provide electrical connection to the circuit board 52 when a key 2 is pressed. The rubber bubble sheet 54 acts in a known manner and provides a spring bias to the keys 2. A support structure 56 for the keys 2 fits over the bubble sheet 54 and is preferably fixed to the bubble sheet 54, for example by gluing. The support structure 56 may be plastics and is divided into individual cells 57 each of which supports a respective key 2. The keys 2 are retained in their respective cells 57 by a scissor-action spring 58 fixed to the key 2 and respective cell 57. The scissor-spring 58 acts in a known manner to secure and control the movement of the key 2. An upper edge trim 60 fits over the support structure 56 to provide rigidity and can be fixed to the base 50 by any suitable means, such as by screws or clips (not shown). The hinges 15 are fitted to the edge trim 60.

Figure 8:
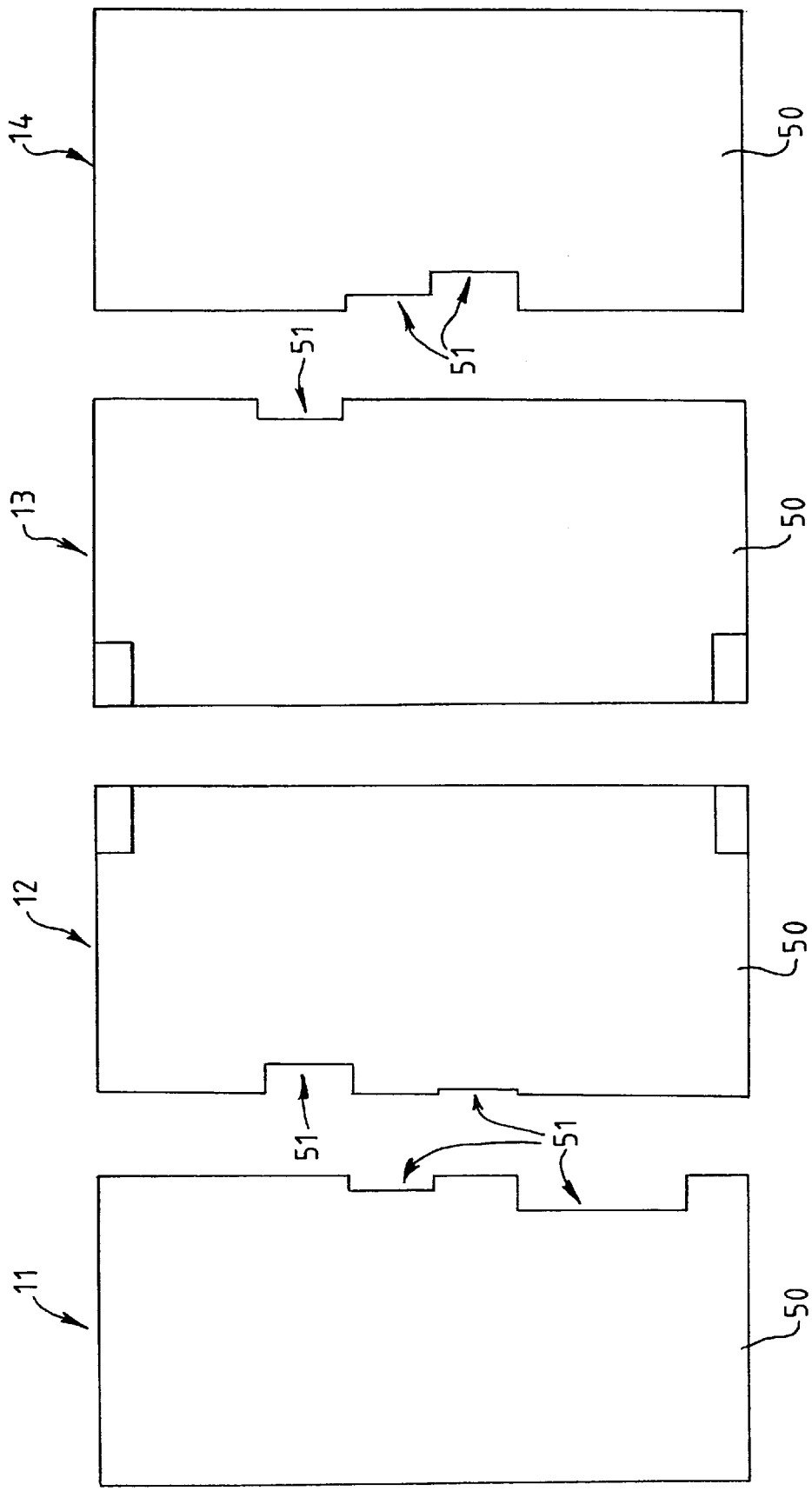
FIG. 8 is a disassembled plan view of bases of the subframes.

In a preferred embodiment, base 50 has recesses 51, the circuit board 52 has recesses 53, and the bubble layer 54 has recesses 55, all of which allow keys on an adjacent subframe to move into the recesses 51,53,55 as necessary during folding as mentioned above. FIG. 8 shows the position of the recesses 51 in the bases 50 of each of the subframes 11–14, the various recesses 51 being positioned according to the positions of the sliding keys mounted on the particular subframe 11–14. It will be appreciated that recesses are not required adjacent the central folding axis 16 for example because the central subframes 12,13 fold outwards.

In order to allow keys 40 to be slidable as mentioned above, the sections 54',56' of the bubble layer 54 and support structure 56 that correspond to the sliding keys 40 are preferably made as separate components, as indicated in FIG. 4 for example. As shown in FIGS. 5A to 5C, the sliding portions 54',56' of the bubble layer 54 and support structure 56 have small rectangular slots 61 through which screws 62 pass for fixing the sliding portions 54',56' to the base 50. Because the fixing screws 62 pass through rectangular slots 61, the sliding portions 54',56' of the bubble layer 54 and support structure 56 can move during folding as necessary and therefore carry the sliding keys 40 with them. A similar construction is used for all of the sliding keys mentioned above. Optionally, as shown in FIG. 5D, the screws 62 may be slightly longer and pass through a small spring 63 before passing through the bubble layer 54 and support structure 56 to provide some freedom of movement in the vertical direction during folding of the keyboard 1.

A system of springs and flexible straps or links are preferably provided in order to encourage or ensure that the sliding keys move as required during folding and unfolding of the keyboard 1. In particular, those keys 20,21,6A that move towards the central folding axis 16 are connected to the adjacent keys towards which they move by flexible straps or links 70 which pass over the central folding axis 16 so that, as the keyboard 1 is folded, the sliding keys are pulled towards the central axis 16. Return springs 71 connect the other ends of these sliding keys to fixed keys mounted on the outermost subframes 11,14 to ensure that these sliding keys return to the proper position when the keyboard 1 is unfolded to its deployed configuration. Optionally, the return springs 71 may be placed within the support structure 56 and connected laterally to the screws 62.

The first set 40 of digit keys is preferably connected by a further spring 72 to the wall of the recess 18 in the first subframe 11, the spring 72 biasing the first set 40 of digit keys into the recess 18 when the keyboard 1 is folded. A resilient link 70 connects the other end of the first set 40 of digit keys to the adjacent fixed digit keys 43 mounted on the second subframe 12, which ensures that the first set 40 of digit keys are pulled back to their proper position when the keyboard 1 is unfolded. A similar spring 73 connects the last set 41 of digit keys mounted on the fourth subframe 14 to the recess 19 in order to bias this last set 41 of digit keys into the recess 19 during folding. The last set of digit keys 41 is connected by a flexible link 74 to the set of digit keys 42 mounted on the third subframe 13 in order to carry the third set 42 of digit keys away from the central folding axis during folding. A further spring 75 connects the other end of the third set 42 of digit keys to the fixed digit keys 43 on the second subframe 12 so that the third set 42 and last set 41 of digit keys are pulled back to their proper position when the keyboard 1 is deployed.

A mechanism for locking the keyboard 1 in its deployed configuration is shown in FIGS. 6A to 6D. Three sprung bolts 80,81,82 slide in recesses 83 provided in the edge trims 60 and/or bases 50 of the subframes 11–14. The bolts 80,81,82 are preferably connected in series to each other by wires 84. The wire 84 running through the first subframe 11 is connected to a tab 85 which projects through an opening 86 in the edge trim 60 of the first subframe 11. The user simply pulls the tab 85 to the left as shown in the drawings, which causes the respective bolts 80,81,82 to move to the left in the drawings, thereby allowing the keyboard 1 to be folded. The position of the tab 85 in the top left hand corner of the keyboard 1 means that it will be locked in position by the second subframe 12 in the collapsed configuration of the keyboard 1. Springs 87 bias the bolts 80,81,82 in the locking direction.

An alternative locking mechanism may have plural rigid rods or bars in place of the wires 84 of the example shown in FIGS. 6A to 6D. The rods are interconnected in series by flexible hinges such as of rubber and an end one of the rods is connected to the operating tab 85. The use of rigid rods does away with the need for the springs 87 of the example shown in FIGS. 6A to 6D. The rods may further be connected to the various sets of sliding keys so that the keys are slid into position and the keyboard 1 is locked open by movement of the tab 85 in a first direction. The tab 85 is operated in the reverse direction to withdraw the locking rods and to slide back the sliding keys to allow the keyboard 1 to be collapsed.

A yet further alternative locking mechanism is shown in FIGS. 7A and 7B. Instead of the linear bolts 80,81,82 of the example shown in FIGS. 6A to 6D, sector-shaped locking bars 90,91,92 can pivot in sector-shaped recesses 93 provided in the subframes 11–14. The locking bars 90,91,92 are connected to one another by wires 94 which are again connected to a tab 85 which projects from the surface of the first subframe 11. When the tab 85 is pulled to the left, the respective locking elements 90,91,92 are all caused to pivot out of locking engagement with the adjacent subframe 12,13,14, thereby allowing the keyboard 1 to be folded. The locking elements 90,91,92 are biased by springs 95 into engagement with the adjacent subframe 12,13,14 so that the keyboard 1 is locked when in its deployed configuration.

The very outermost edges of the first and fourth subframes 11,14 are preferably provided with upward facing curves 100,101 which allows the keyboard 1 to have a smooth and attractive finish when in its collapsed or folded configuration. A clip 102 may be provided on one of the upward curves 100 so as to engage in a corresponding recess 102 on the other upward curve 101 in order to lock the keyboard 1 in its collapsed configuration. A similar clip may act at the base of the second and third subframes 12,13 to prevent the central portion of the keyboard 1 from opening out when the keyboard 1 is in its collapsed configuration; such a clip may be provided by a thin magnetic strip attached to the base 50 of the second and third subframes 12,13. The curves 100,101 also serve to protect any keys which overhang the central folding axis 16. This is facilitated by virtue of the first and fourth subframes 11,14 being wider than the second and third subframes 12,13. It will be understood that various other locking mechanisms may be suitable for performing the desired locking function and are within the scope of the present invention.

The relative height of the keys 2 can be such that the keys 2 touch each other on their top surfaces when the keyboard 1 is in its folded configuration, the keys 2 depressing each other so as to reduce the thickness of the folded keyboard 1 to an absolute minimum.

There is space within the subframes 11–14 to accommodate a short piece of cable and connector for connecting the keyboard 1 to a device such as a computer. Alternatively or additionally, a small infra-red unit may be contained within the subframes 11–14 for providing a connection to a suitably equipped computer. As a further alternative, a connection cable could be accommodated within the space under the curved sections 100,101. Such a cable may have a slightly magnetic outer sheath so that it can be stored tidily when the keyboard 1 is in its collapsed configuration.

An alternative mounting for the keys 2 is shown in FIGS. 9 and 10. The base 50 of each subframe 11–14 is provided with plural parallel rails 110 of T-shape cross-section across its centre. Each rail 110 therefore provides opposed flanges 111 raised from the surface of the base 50. Corresponding side flanges 112 are provided at the edges of the base 50 as shown. The support structure 56, particularly the sliding support structure 56', to which the keys 2 are fixed is provided in each case with a corresponding pair of opposed flanges 113 which engage under the flanges 111,112 of the base 50 to retain the support structure 56,56' on the base 50. This is a particularly advantageous method of mounting for the sliding keys as manufacture of the keyboard 1 is simplified.

Figure 11:
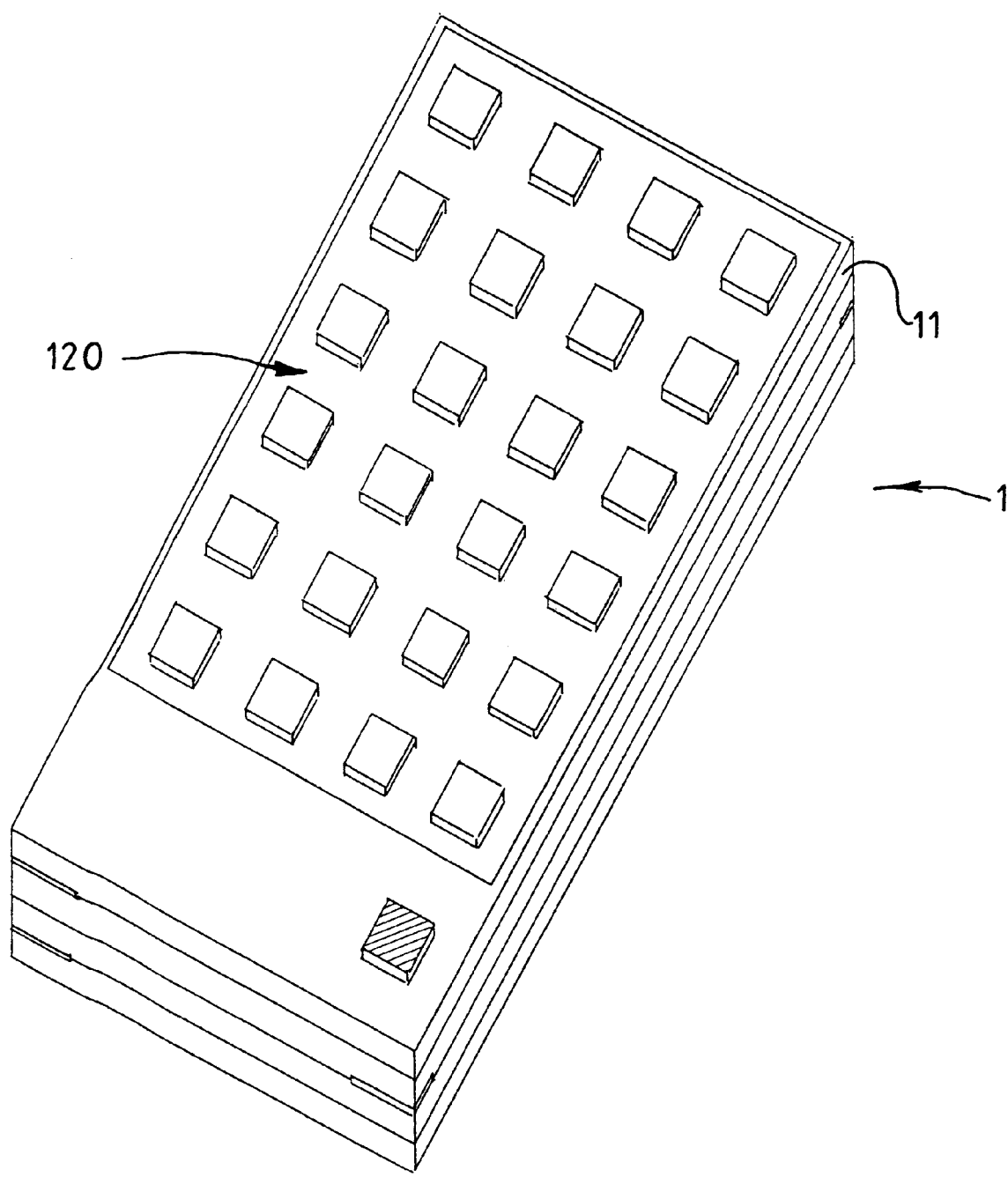
FIG. 11 is a diagrammatic perspective view of a further example of a keyboard in accordance with the present invention in its collapsed configuration with the addition of keys on the front panel.

A further example of the present invention is shown in FIG. 11. The folding keyboard 1 is combined with a remote control unit having control keys 120 on an upper surface (i.e. the rear of one of the end subframes 11) of the keyboard 1 when in its folded configuration. Thus, when the keyboard 1 is in its folded configuration, it can be used as a remote control device for controlling any suitable apparatus. The keyboard 1 can be deployed for use as a keyboard whenever required, and can even be used to send signals corresponding to data input via the keyboard 1 to the apparatus being controlled remotely. Examples of such include televisions, interactive television systems, screen telephones, computers connected to the Internet, so-called "network computers" (which have only a small storage capacity hard disk or no hard disk at all), etc. This combination of a remote control unit and a folding keyboard 1 according to the present invention conveniently provides the user with full keyboard functions whilst allowing the remote control unit to remain small and unobtrusive when keyboard functions are not required. This may be particularly advantageous in a domestic environment.

In a preferred embodiment keyboard 1 includes is constructed such that at least some of the keys, and preferably at least some of the slidable keys, are biased toward their deployed position when the keyboard is deployed. Keys 2 can be biased by any suitable type of spring or the like. It is further preferred that keyboard 1 be constructed such that when it is in its collapsed configuration, the support structure encases each depressed key. This helps prevent damage to the keys during transport of the keyboard.

While an embodiment of the present invention has been described with particular reference to the examples illustrated, it will be appreciated that variations and modifications may be made to the examples described within the scope of the present invention. For example, the keys 2 may be of the touch pad/membrane type instead of the mechanically sprung type shown in the drawings. This may allow the keyboard 1 to have a slimmer cross-section in its collapsed configuration and may also save in manufacturing costs compared to the mechanically sprung keys 2 described above. It may also avoid the need to have some of the keys slide during deployment and collapsing of the keyboard 1, which would certainly provide savings in manufacturing costs. A particularly slim collapsed keyboard 1 is very desirable when the keyboard 1 is combined with a remote control unit as described above, or with portable devices such as mobile telephones.

What is claimed is:

1. A collapsible keyboard comprising:
   four substantially rigid subframes arrayed in a row, each pair of adjacent subframes being relatively pivotably connected together along a folding axis, said folding axes being substantially mutually parallel; and
   a plurality of keys mounted on said subframes;
   the keyboard being foldable about said folding axes between a deployed configuration in which the keyboard is generally planar and a collapsed configuration.

2. The keyboard according to claim 1, wherein the keyboard is foldable in opposite directions on adjacent folding axes.

3. The keyboard according to claim 1, wherein at least some of said keys are slidable relative to a subframe in a direction transverse to said folding axes.

4. The keyboard according to claim 3, further including at least one flexible connector connecting at least some of said slidable keys to other keys across one of said folding axes such that said at least some of said slidable keys slide relative to said subframe as the keyboard is folded into the collapsed configuration.

5. The keyboard according to claim 3 wherein at least some of said slidable keys are shifted into their deployed position when the keyboard is unfolded to the deployed configuration.

6. The keyboard according to claim 1, further comprising a support structure for said keys.

7. The keyboard according to claim 6 wherein said support structure comprises a matrix of cells, each cell accommodating a respective key.

8. The keyboard according to claim 7 wherein at least some of said keys are depressed when the keyboard is in its collapsed configuration and said support structure encases each depressed key when the keyboard is in the collapsed configuration.

9. The keyboard according to claim 1, further comprising a support structure for said keys, wherein at least some of said keys are mounted so as to be slidable relative to a subframe in a direction transverse to said folding axes, and wherein portions of the support structure are slidable with said slidable keys.

10. The keyboard according to claim 1, further comprising a lock for maintaining the keyboard in its deployed configuration.

11. The keyboard according to claim 10 wherein said lock comprises locking elements that are biased into recesses in said subframes in the keyboard.

12. The keyboard according to claim 10 wherein said lock includes a button and is releasable by operation of said button.

13. The keyboard according to claim 1, further comprising a lock for locking the keyboard in its collapsed configuration.

\* \* \* \* \*